US009889490B2

(12) United States Patent
Henry

(10) Patent No.: US 9,889,490 B2
(45) Date of Patent: Feb. 13, 2018

(54) COOKWARE FORMED OF A SINGLE METAL SHEET AND METHOD FOR MAKING SAME

(71) Applicant: HENRY JOHNSON PTY LTD AS TRUSTEE FOR THE HENRY JOHNSON FAMILY TRUST, Queensland (AU)

(72) Inventor: Mark James Henry, Dijon (FR)

(73) Assignee: HENRY JOHNSON PTY LTD AS TRUSTEE FOR THE HENRY JOHNSON FAMILY TRUST, Queensland (AU)

( * ) Notice: Subject to any disclaimer, the term of this patent is extended or adjusted under 35 U.S.C. 154(b) by 0 days.

(21) Appl. No.: 15/258,095

(22) Filed: Sep. 7, 2016

(65) Prior Publication Data
US 2017/0065122 A1 Mar. 9, 2017

Related U.S. Application Data

(60) Provisional application No. 62/215,370, filed on Sep. 8, 2015.

(51) Int. Cl.
B21D 51/22 (2006.01)
A47J 27/00 (2006.01)
(Continued)

(52) U.S. Cl.
CPC ............ B21D 51/22 (2013.01); A47J 27/002 (2013.01); A47J 45/061 (2013.01); B25G 1/102 (2013.01); A47J 37/10 (2013.01)

(58) Field of Classification Search
CPC ........ B21D 22/14; B21D 22/16; B21D 22/18; B21D 51/22; A47J 27/002; A47J 45/061; B25G 1/102
See application file for complete search history.

(56) References Cited

U.S. PATENT DOCUMENTS 217,938 A 7/1879 Graves
998,927 A 7/1911 Simmons
(Continued)

FOREIGN PATENT DOCUMENTS

GB 138998 A 2/1920
GB 508891 A 7/1939
GB 991735 A 5/1965

Primary Examiner — Edward Tolan
(74) Attorney, Agent, or Firm — Epstein Drangel LLP; Robert L. Epstein

(57) ABSTRACT

The profile shape of the vessel body and of handle portion is formed from a single sheet of metal to create a flat by cutting, stamping or blanking. An opening is created in the handle portion to reduce heat propagation. The shape of the pan body is formed by spinning with the flat handle portion. The handle is formed by creating three-dimensional contours in the handle portion of the blank. The neck portion has a flat section adjacent the pan body followed by sections of different curvature. One section of the neck portion has a deeply curved cross-section. That neck portion transitions to the hand grip portion which has a reduced curvature, particularly toward the unattached end of the handle. The neck portion may have a "W" cross sectional shape. The handle grip portion may have a "U" shaped cross-section for comfort.

31 Claims, 6 Drawing Sheets

(51) Int. Cl.
  *B25G 1/10*    (2006.01)
  *A47J 45/06*   (2006.01)
  *A47J 37/10*   (2006.01)

(56) References Cited

U.S. PATENT DOCUMENTS

| | | | | |
|---|---|---|---|---|
| 1,014,342 | A * | 1/1912 | Smith et al. | A47J 45/071 |
| | | | | 220/603 |
| 1,850,395 | A * | 3/1932 | Hughes | B21J 9/025 |
| | | | | 29/894.324 |
| 2,283,019 | A * | 5/1942 | Serr | A47J 29/00 |
| | | | | 220/23.87 |
| 2,618,258 | A * | 11/1952 | Kroyer | A47J 37/10 |
| | | | | 126/390.1 |
| 2,722,173 | A * | 11/1955 | Dorr | A47J 37/10 |
| | | | | 126/390.1 |
| 2,941,289 | A * | 6/1960 | Chace | A47J 36/02 |
| | | | | 428/677 |
| 4,491,235 | A * | 1/1985 | Fournier | A47J 27/002 |
| | | | | 126/390.1 |
| 5,307,951 | A * | 5/1994 | Kuhn | A47J 27/002 |
| | | | | 220/771 |
| 5,511,466 | A * | 4/1996 | Dzibinski | A47J 37/101 |
| | | | | 126/385.1 |
| 6,145,362 | A * | 11/2000 | Piispanen | B21K 23/04 |
| | | | | 72/82 |
| 6,793,093 | B2 * | 9/2004 | Tsai | A47J 27/002 |
| | | | | 220/573.1 |
| 7,490,732 | B2 * | 2/2009 | Wasserman | A47J 45/061 |
| | | | | 16/425 |
| 9,498,084 | B2 * | 11/2016 | Groll | A47J 37/10 |
| 2010/0084412 | A1 | 4/2010 | Huang | |

* cited by examiner

COOKWARE FORMED OF A SINGLE METAL SHEET AND METHOD FOR MAKING SAME

CROSS-REFERENCE TO RELATED APPLICATIONS

Priority is claimed on Provisional Patent Application No. 62/215,370, filed Sep. 8, 2015, the contents of which are incorporated herein by reference.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to cookware and more particularly to cooking vessels fabricated from a single piece of sheet metal and to a method for making same.

2. Description of Prior Art Including Information Disclosed Under 37 CFR 1.97 and 1.98

Cooking vessels have had some advances in recent years in materials and construction methods, with some improvements leading to some improved cooking performance and/or convenience for consumer cooks. One area that has had very little attention is the cookware used by commercial kitchens and restaurants, with the most common pans still in use being very similar to pans of several hundred years ago in materials and manufacturing methods. The most common commercial pan is the classic French style skillet with pressed steel sheet pan body secured to a strip metal handle most commonly by three rivets.

These pans are still the standard because their bare steel pan surfaces do not wear out, and the natural nonstick 'seasoning' built up by cooking with fats and oils can withstand the high heats required of commercial cookery without the chemical breakdown experienced by synthetic coatings at high heat, or the relatively rapid mechanical breakdown from the severe abrasion environment (food chemistry, utensils, cleaning). The metal strip or tube handles are also favored over synthetic handles because commercial cookery techniques often involve transfer of pans from stove to oven, or baking food entirely in the oven at temperatures that rapidly deteriorate or destroy polymer handles.

The limitations inherent in this traditional steel cookware, as observed and discussed with cooks over a period of several decades on several continents, include:

1. Rivets heads in the pan body, joining the handle, are a site for sheltering food residue, being difficult to clean around.
2. Rivets can work loose over time, leading to increasing freeplay between handle and pan body, and occasional catastrophic failure.
3. Traditional narrow strip steel handles are uncomfortable for cooks to handle over long periods of pan work, particularly when a significant proportion of a restaurant cook's pan work involves shuffling the food in the pan by agitating the handle, or the classic sauté toss.
4. Round handles which seem to be comfortable in a static grip can become fatiguing in the abovementioned dynamic situations because there is a significant, and undesired, rotational force (typically from unbalanced food loads during the sauté toss) that needs to be controlled by squeezing the handle to produce the required friction to counter the rotational moment. Narrow strip handles can also be poor in this regard due to their limited leverage in the rotational direction. These forces are rarely perceived by cooks and their strained hands and arms are regarded as a 'normal' part of all the movement in their work. Static comfort is relatively easy to achieve, being any shape which feels comfortable when gripped statically by the user. However, dynamic performance and reduction of strain is a different matter, and not as evident. Design to counter the dynamic forces is not apparent in prior art, particularly in the common narrow flat strip steel handles. Less evident is the dynamic deficiency inherent in handles that are too round in cross-section, being apparently designed to maximize static comfort, while being the least optimal for controlling rotational forces (due to the resulting hand strain from the additional squeezing required to generate the necessary friction to control those forces).
5. Many all-metal handle designs (riveted/welded or cast) in the market conduct significant heat up the handle to the zone gripped by the cook's hand. In commercial kitchens cooks usually grip their pans with a cloth or glove to avoid burns from this heat transfer. It would be apparent that a single-piece metal pan would conduct more heat from the pan body up the handle, being one continuous conduit for the conducted heat. This is particularly evident in most cast iron pans with short/thick handles, or in pans with short and thick welded or riveted handles.
6. There exists spot-welded or arc-welded examples of pan-handle joins in commercial cookware, though these are generally not as trusted by cooks for fear of catastrophic spot weld failure, or not as commercially viable in the case of the stronger arc welding methods with higher fabrication costs.
7. A common cookware annoyance for consumers is the tendency for handles with screws to become loose when the screw loosens. A one-pieced formed metal pan eliminates this annoyance.
8. Pan lids can lack durability if they have joined handles, or their handles are made with materials that don't survive high temperatures in ovens. Metal lid handles can become hot on the stove-top.

There evidently remains scope to improve the hygiene, durability, dynamic handle ergonomics, and handle heating of traditional metal commercial cookware and their lids. An obvious solution for the hygiene and durability limitations discussed above would be to make the pan and handle from a single piece of metal, preferably steel, iron, or stainless steel, to eliminate all joins and seams. Hand- or machine-wrought single piece pans have been known since antiquity, though their artisanal, labor-intensive manufacturing methods have not proven viable for the relatively low-cost cookware demanded in most commercial kitchens, and by most consumers today. Cast iron can produce very suitable one-piece shapes, though the thick sections required for the iron pouring process renders the cookware too heavy for regular prolonged and very physical commercial cookery methods. They are simply too fatiguing for chefs, or for anyone with relatively weak hands or arms.

Though the focus of this invention is to improve cookware for commercial cookery environments, the most demanding environment for cookware, it should be evident that the improvements embodied in this invention would also satisfy the most demanding of home cooks.

In general, it is the purpose of this invention to address the existing perceived deficiencies noted above with a new combination of manufacturing methods and new design features for metal cookware and lids.

It is therefore a prime object of the present invention to provide cookware formed from a single metal sheet and a method for making same.

It is another object of the present invention to provide cookware formed from a single metal sheet and a method for making same in which there are no rivet heads are present joining the pan body and handle, eliminating a site for sheltering food residue, or which are difficult to clean around.

It is another object of the present invention to provide cookware formed from a single metal sheet and a method for making same in which there are no rivets that can work loose over time, leading to increasing play between handle and pan body, and occasional catastrophic failure.

It is another object of the present invention to provide cookware formed from a single metal sheet and a method for making same in which the handles are comfortable for cooks to use over long periods of pan work.

It is another object of the present invention to provide cookware formed from a single metal sheet and a method for making same in which the handles are comfortable to use when pan work involves shuffling the food in the pan by agitating the handle, or the classic sauté toss.

It is another object of the present invention to provide cookware formed from a single metal sheet and a method for making same in which the shape of the handles improves the dynamic performance of the pan.

It is another object of the present invention to provide cookware formed from a single metal sheet and a method for making same in which the shape of the handle reduces the strain from use.

It is another object of the present invention to provide cookware formed from a single metal sheet and a method for making same in which the amount of heat which is conducted by the handle from the pan body to the hand grip portion is reduced.

It is another object of the present invention to provide cookware formed from a single metal sheet and a method for making same in which spot-welding or arc-welding pan-handle joints are eliminated.

It is another object of the present invention to provide cookware formed from a single metal sheet and a method for making same in which there are no screws that can become loose.

It is another object of the present invention to provide cookware formed from a single metal sheet and a method for making same in which the same manufacturing method can be used to fabricate pan lids with handles with the same advantageous characteristics.

It is another object of the present invention to provide cookware formed from a single metal sheet and a method for making same in which pan lids with handles have improved durability.

It is another object of the present invention to provide cookware formed from a single metal sheet and a method for making same in which the handles are made with materials that are capable of surviving the high temperatures in ovens.

It is another object of the present invention to provide cookware formed from a single metal sheet and a method for making same in which the lid handles do not become excessively hot on the stove-top.

It is another object of the present invention to provide cookware formed from a single metal sheet and a method for making same in which the same benefits apply equally to frying pans, saucepans, and pots of all types.

BRIEF SUMMARY OF THE INVENTION

In the following description, wherever the term "pan" is used, it is intended to include all styles of cooking vessels having round bodies.

In general, the above noted objects are achieved by the present invention one feature of which relates to a method for fabricating a cookware vessel with a handle from a single sheet of metal. The method includes the steps of: (a) forming the profile shape of the vessel, including the shape of the handle portion, from a single sheet of metal to create a flat profiled blank; (b) spinning the flat profiled blank to form the blank into the desired shape of the vessel body with an integral handle portion; and (c) forming the handle of the desired shape by creating three-dimensional contours in the handle portion.

The step of forming the profile shape of the vessel, including the shape of the handle portion, from a single sheet of metal to create a flat profiled blank includes cutting the single sheet of metal to create the desired profile.

The step of forming the profile shape of the vessel, including the shape of the handle portion, from a single sheet of metal to create a flat profiled blank includes stamping the single sheet of metal to create the desired profile.

The step of forming the profile shape of the vessel, including the shape of the handle portion, from a single sheet of metal to create a flat profiled blank includes blanking the single sheet of metal to create the desired profile.

The step of forming the profile shape of the vessel, including the shape of the handle portion, from a single sheet of metal to create a flat profiled blank further includes reducing the amount of metal in the handle portion.

The step of reducing the amount of metal in the handle portion includes creating at least one and preferably more than one opening in the handle portion. Preferably, at least 30% of the handle width is removed.

The step of spinning the flat profiled blank is performed on a CNC spinning machine. The resulting blank preferably has a thickness in the range of 1 mm to less than 8 mm. Most preferably, the blank thickness is in the range of 2 mm to less than 5 mm.

The metal sheet may be formed of low carbon mild steel, carbon steel or stainless steel.

The step of forming the handle includes imparting additional strength in the vertical plane with curved cross-section portions. This may be done using a stamping-forming die set operated by a suitable press of sufficient tonnage. The flat unformed handle portion of the blank is inserted between the upper and lower dies in the die set and is pressed with sufficient force to permanently deform the flat handle portion into the desired three-dimensional form, while sheet thickness remains constant.

The step of forming the handle includes forming the hand grip portion to have a "U" shape cross-section.

The step of forming the handle includes forming the neck portion to have a flattened "U" shape cross-section.

The step of forming the handle includes forming the neck portion to have a deeply curved cross-section section and a section having a reduced curvature. The curve in the deeply curved section of the neck portion is deeper for thinner and lower tensile strength metals.

The section with reduced curvature is proximate the pan body. The reduced curvature section of the neck portion is 60 mm wide and has a curvature in cross-section of R200 mm or less. Preferably, the reduced curvature section handle portion is formed to have a curvature of R100 mm or less.

The neck portion immediately adjacent the pan body is formed to be substantially flat to aid the transition between handle and the pan body with minimal distortion The section of the neck portion of the handle that transitions to the hand grip portion is approximately between 100 mm and 270 mm from the pan body and is formed to be less wide and less deep in cross-section than the deeply curved section of the neck portion.

The transition section of the neck portion is preferably formed with a curvature within the range of R1000 mm to R10 mm, and more preferably a curvature within the range of R500 mm to R30 mm.

In accordance with another aspect of the present invention, a cookware vessel is provided having a pan body with an integral handle fabricated from a single sheet of metal.

The handle has at least one opening therein. Preferably, the at last one opening includes at least 30% of the handle width.

The metal sheet may be made of low carbon mild steel, carbon steel, or stainless steel.

Additional strength is imparted to the handle in the vertical plane with curved cross-sections.

The handle has a hand grip portion having a "U" shaped cross-section, preferably a flattened "U" shape cross-section.

The handle has a neck portion with a deeply curved cross-section. The curve in the deeply curved neck portion section is deeper for thinner and lower tensile strength metals.

Preferably, the neck is 60 mm wide with a neck portion curvature in cross-section of R200 mm or less.

The section of the neck portion adjacent the pan body is substantially flat. The neck section adjacent the flat section has a reduced curvature of R100 mm or less.

The section of the neck portion where the neck portion transitions to the hand grip portion is located approximately between 100 mm and 270 mm from the pan body. The transition section is less wide and less deep in cross-section than the deeply curved section. It has a curvature within the range of R1000 mm to R10 mm, preferably within the range of R500 mm to R30 mm.

BRIEF DESCRIPTION OF THE SEVERAL VIEWS OF DRAWINGS

To these and to such other objects that may hereinafter appears, the present invention relates to single-piece formed sheet metal cookware and method of making same as described in detail in the following specification and recited in the annexed claims, taken together with the accompanying drawings, in which like numerals refer to like parts and in which:

DETAILED DESCRIPTION OF THE INVENTION

Figure 1:
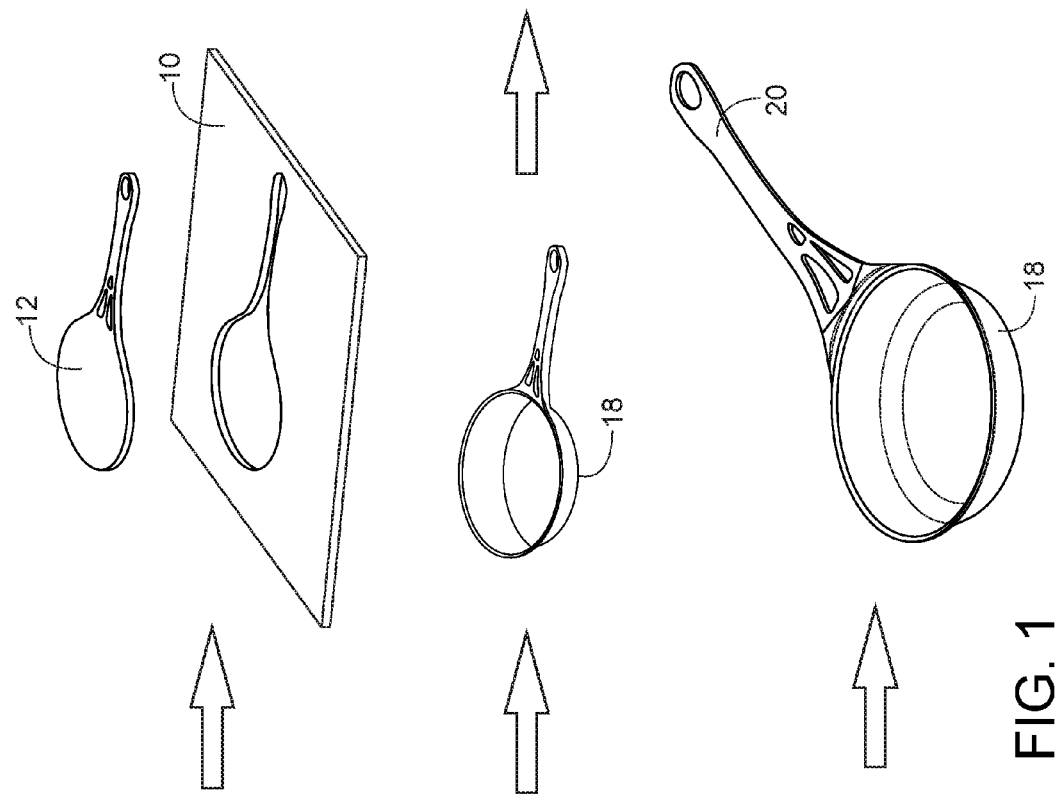
FIG. 1 is a schematic representation of the manufacturing steps used in fabricating a cooking vessel in accordance with the present invention.
Figure 1:
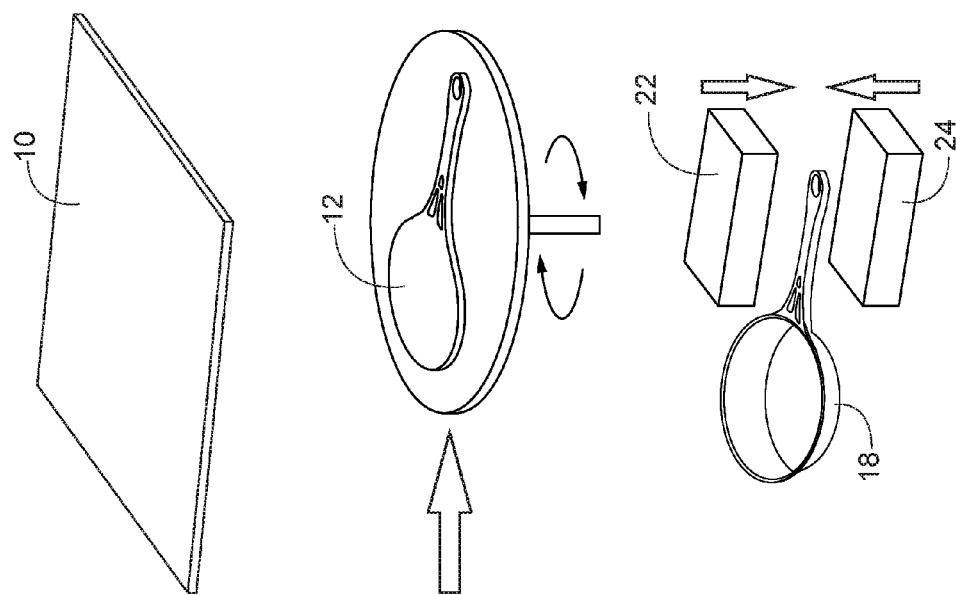

As illustrated in FIG. 1, the fabrication method begins with a sheet of metal 10 of appropriate thickness. The metal sheet can be made of any suitable metal, preferably steel, iron, stainless steel, copper, or titanium although any other heat conductive metal suitable for cookware can be used.

Sheet 10 is formed into the final shape using a combination of three key manufacturing methods: profile blanking, spinning to form the vessel and handle forming. Each of the methods is described in detail.

1) Profile blanking: The profile shape of the entire vessel (handle and pan body) is either cut or stamped/blanked from metal sheet 10 in a single flat piece 12. CNC laser cutting is preferred for this procedure because it has economical and practical advantages over other profiling or blanking methods, although other methods are possible. Waterjet cutting could also be used, but at a higher cost per unit.

Blanking of the relatively large and unbalanced shape of the handle and pan body such as that of the present invention would require a very large and complex die set. Creation of such a die set would take a significant financial investment and therefore decrease price viability of the final product when that investment is amortized over each production unit.

One desired goal of the invention—to reduce heat conduction up the handle—is achieved at this stage of processing by using creating multiple large perforations 14a, 14b and 14c in the handle neck portion to optimize the ratio of surface area to metal volume. This technique transfers more of the internal conducted heat to the air through radiation and convection, similar to the principle of fins on a heat sink or air-cooled engine.

A flat handle has the significant disadvantages of being uncomfortable and too weak to support heavy vessels, particularly with food loads. Those disadvantages are overcome in the present invention by imparting a gradually changing curvature to the handle, as explained in detail below.

2) Spinning to form vessel body: The flat profiled sheet 12 with integral pan and handle portion shape is loaded on the platform 16 of a CNC spinning machine (not shown). The spinning machine forms the pan body shape 18 over a suitably shaped mandrel with a CNC-controlled roller, in the normal metal spinning method. The long protruding handle portion remains flat as an extension from the formed pan body 18, untouched by the pan body forming process.

At this point the pan could be used, but would have some serious limitations for commercial cookery; being too weak in the handle (bending too readily when loaded, for viable handle widths and sheet thicknesses), and too uncomfortable (or at least no advantage over other common traditional long strip handles).

Though a manual spinning machine may be employed, the long projecting and rotating handle creates a safety hazard for operators, and the forces involved for forming sufficiently thick sheets of metal are greater than those easily manually produced.

Sheet thicknesses for ideal conduction and strength will vary according to material properties and the purpose of each cooking vessel, but a guide would be in the range of 1 mm to 8 mm, with the 2 mm-5 mm range being preferred for steel sheets (low carbon mild steels, carbon steels, stainless steels).

An advantage of spinning to form the pan body, as compared to traditional pressing, is that the thickness of the base of the pan body is not reduces from the original sheet thickness, while the wall if the pan body is thinned through deformation and 'wiping' the sheet metal along the rotating forming mandrel (which is a hardened die with dimensions of the desired form of the inside of the vessel). Heat conduction can therefore be very good in the relatively thick metal base, while the weight can be minimized by the thinner pan body wall which is mostly only required for containing the food, particularly liquids.

3) Handle forming: To form the handle 20 into a comfortable and dynamically performing handle shape with suitable three-dimensional contours, and to impart additional strength in the crucial vertical plane with curved cross-sections, the most viable forming method was found to be a traditional stamping-forming die set 22, 24 operated by any suitable press of sufficient tonnage.

The flat unformed handle profile is inserted between the upper and lower die set 22, 24 and pressed with sufficient force to permanently deform the flat handle profile into the desired three-dimensional form, while sheet thickness remains constant.

A cross-sectional shape like a classic 'U' section is most comfortable for the hand grip portion 26 of the handle 20, while a 'W' section would be stronger for a section of the neck portion 28 but less comfortable for the hand grip portion 26. While a simple 'V' section would impart strength, it would not be ideal for handle comfort in the hand grip portion.

For most practical metals and thicknesses, a flattened 'U' shape is sufficient for strength in the handle grip portion, and desirable for comfort (though comfort will be reduced at some point with decreasing cross-sectional radius).

Additional strength is imparted to the handle shape with increasing the depth of a section of the neck portion. Accordingly, the neck portion 28 can be formed with deeper curved cross-section 29 for strength, and the hand grip portion 26 can have a reduced curvature as load decreases toward the unattached end 32, for more hand comfort. The end 32 of the hand grip portion 26 can have an additional opening 33 to permit the vessel to be suspended from a hook.

Figure 5:
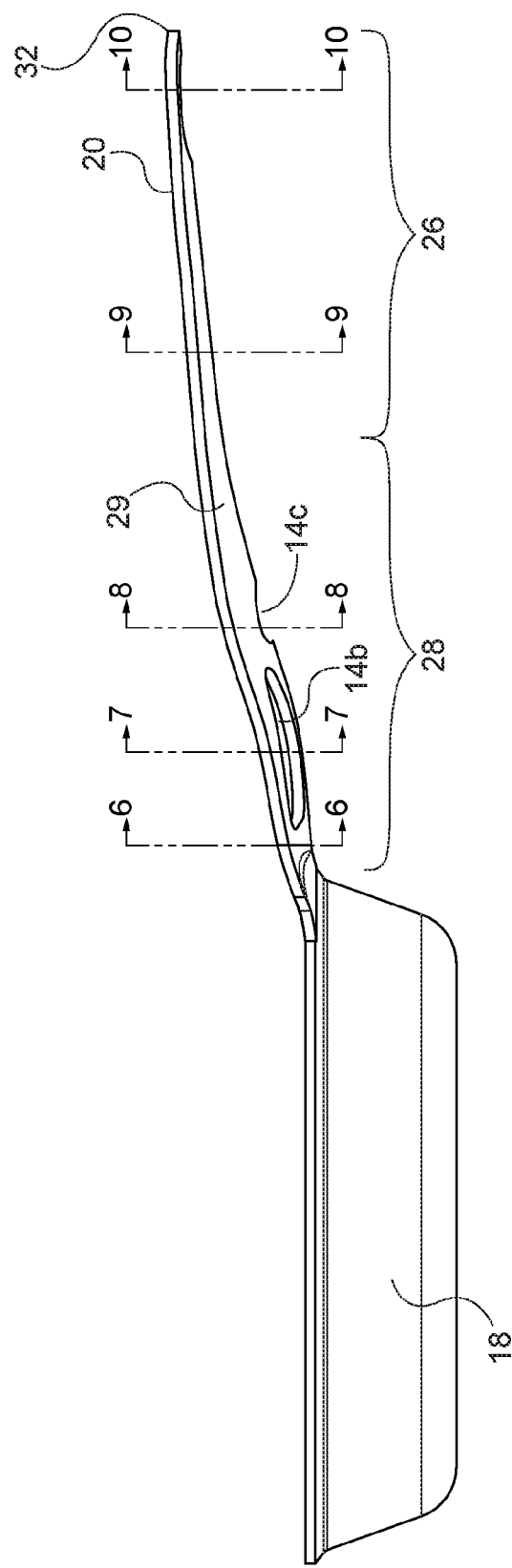
FIG. 5 is an elevation view of the side of a cooking vessel fabricated by the method of the present invention.

As best seen in FIG. 5, the handle section 15 situated between cut-out portions 14a and 14b of the neck portion 28 is arcuate and formed in this operation to extend below the plane of the remainder of the handle. This structure imparts additional strength to the neck portion 28 without increasing thermal conduction from the pan body 18 to the hand grip portion 26.

Figure 6:
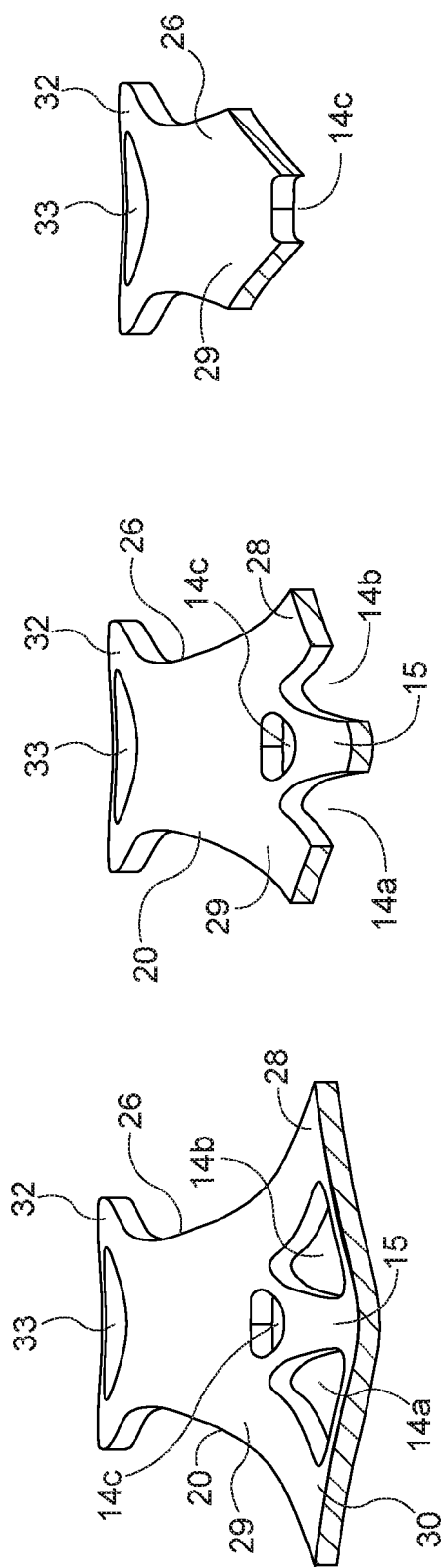
FIG. 6 is a cross sectional view of the handle of a cooking vessel of the present invention taken along line 6-6 of FIG. 5.

The curve in the neck portion 28 would need to be deeper for thinner and lower tensile strength metals. Preferably, a wide neck of 60 mm, with venting cut-outs 14 of 30% of the width, in 2 mm low carbon mild steel would benefit from a neck curvature in cross-section of R200 mm or less as seen in FIG. 6. However, section 30 of the neck portion immediately adjacent the pan body 18 can be substantially flat to aid the transition between handle and pan body wall with minimal distortion. The radius of the wall of the pan body itself adds strength to flat portion 30.

Figure 7:
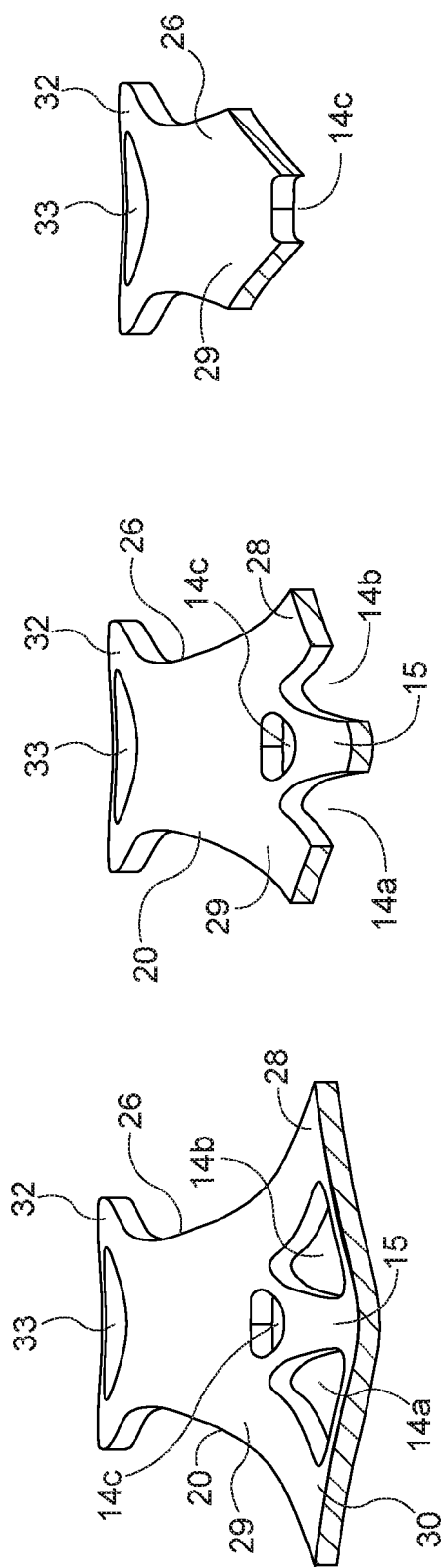
FIG. 7 is a cross sectional view of the handle of a cooking vessel of the present invention taken along line 7-7 of FIG. 5.

Section 29 of the neck portion benefits from deeper curvature for strength, ideally R100 mm or less as seen in FIG. 7, though a slight curvature of R500 mm would support most regular pan vessel types, with materials of reasonable strength and width (for example, low carbon mild steel of 2 mm thickness and 40 mm width, at a distance around 50 mm from the vessel walls).

Figure 8:
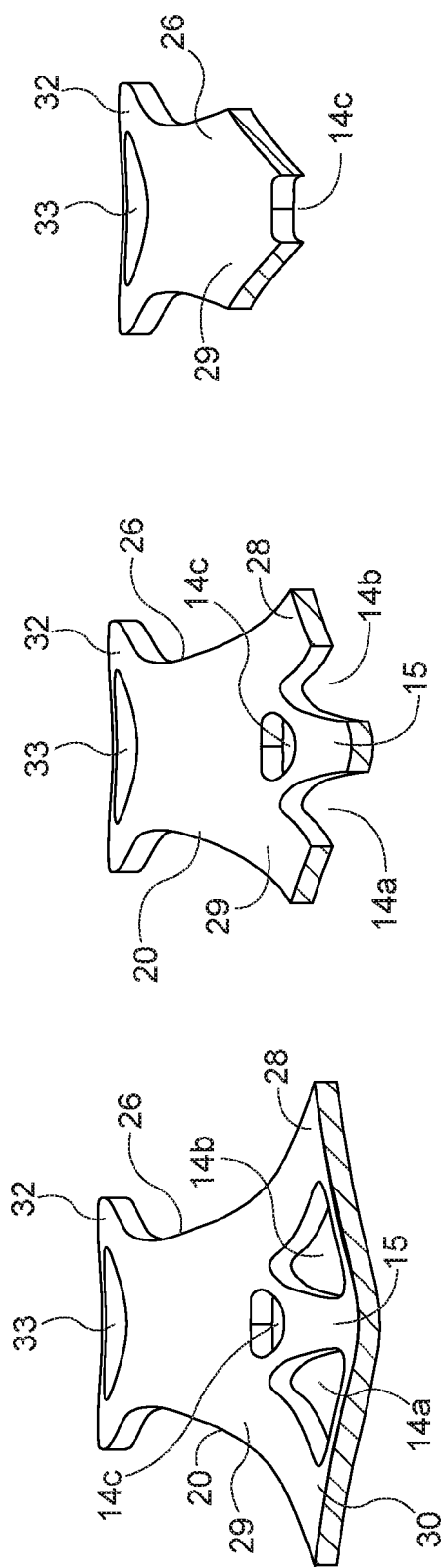
FIG. 8 is a cross sectional view of the handle of a cooking vessel of the present invention taken along line 8-8 of FIG. 5.

The handle 20 transitions to the portion 26 normally gripped by the hand. Typically, the hand grip portion 26 is located approximately between 100 mm and 270 mm from the pan body wall. It is necessary for the handle profile in the hand grip portion to become less wide for the comfort of fingers wrapped around the handle, and less deep in cross-section. As seen in FIG. 8. this portion can be curved from R1000 mm to R10 mm, though an optimal range would be from R500 mm to R30 mm for combination of handle strength and finger comfort.

Figure 10:
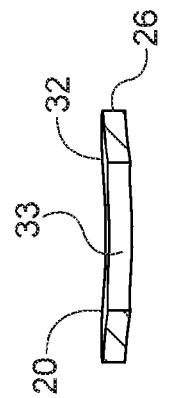
FIG. 10 is a cross sectional view of the handle of a cooking vessel of the present invention taken along line 10-10.
Figure 9:
FIG. 9 is a cross sectional view of the handle of a cooking vessel of the present invention taken along line 9-9 of FIG. 5.

According to beam theory, the handle material is subject to less tensile force toward the unattached end 32 of the handle, away from the pivot point of the hand grip portion, so less curvature and less width of handle is required to resist the forces involved, allowing more freedom for choosing a comfortable handle section. Accordingly, the end 32 of the handle portion has only a slight curvature as seen in FIG. 10.

An important consideration during professional cookware handle design is that chefs largely grip pans with an 'underhand' grip (fingers on top and palm under handle), while consumers typically grasp pans with an 'overhand' (fingers underneath) grip. A handle intended for both markets needs to accommodate both styles of grip, handle sectional radii shouldn't be extreme in either direction, and sharp edges should be removed to avoid pinching fingers in either direction.

While it would be possible to form the handle into an open rounded or oval tubular section with more die forming operations, the thick metal (since the cookware base is made of the same sheet, and therefore has the same thickness as the handle) required for quality cookware is not easily formed into tight handle radii without splitting, and complex forms in the longitudinal plane are difficult to achieve. Most tubular pan handles are essentially straight for this reason. A folded hollow handle with longitudinal split and open ends would also create a hygiene hazard. Furthermore, the rounder a handle becomes, the more squeezing of the hand (subconsciously) is required to generate the friction to control the previously mentioned rotational forces when the pan is in motion.

The same principles discussed above may be employed to make any style of cookware that has a round body shape. Further, the same manufacturing techniques can be used to produce single piece lids for cookware that have extended handles.

Because the handle thickness is necessarily the same thickness as the base of the pan body, being profiled from the same sheet of metal, most viable thicknesses for commercial cooking (ideally 2 mm-4 mm for most pans) need additional strengthening in the vertical plane by pressing the handle to sufficient cross-sectional depth in that plane to increase beam strength.

Figure 2:
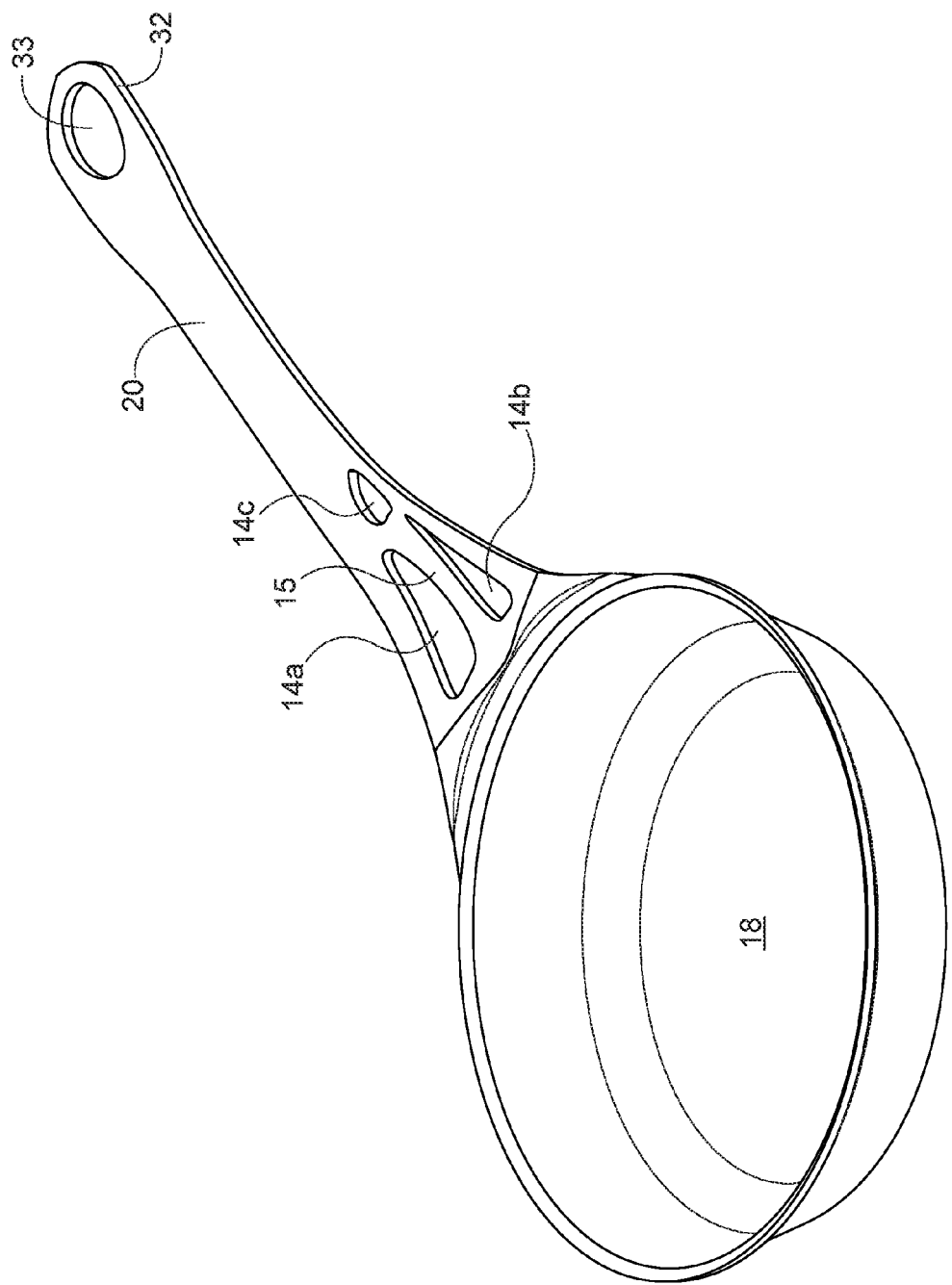
FIG. 2 is a perspective view of a the top and side of a cooking vessel fabricated by the method of the present invention.
Figure 3:
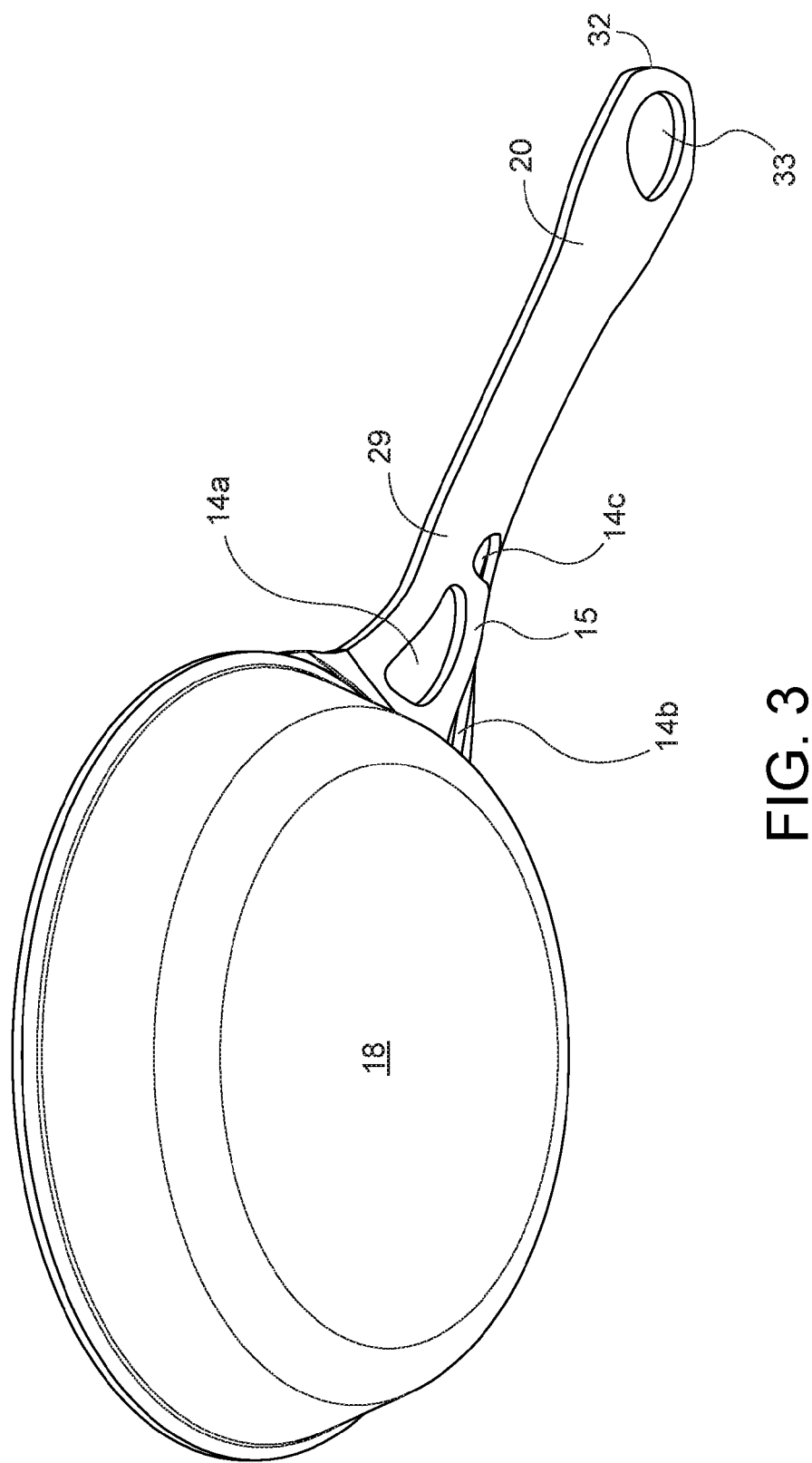
FIG. 3 is a perspective view of a the bottom and side of a cooking vessel fabricated by the method of the present invention.
Figure 4:
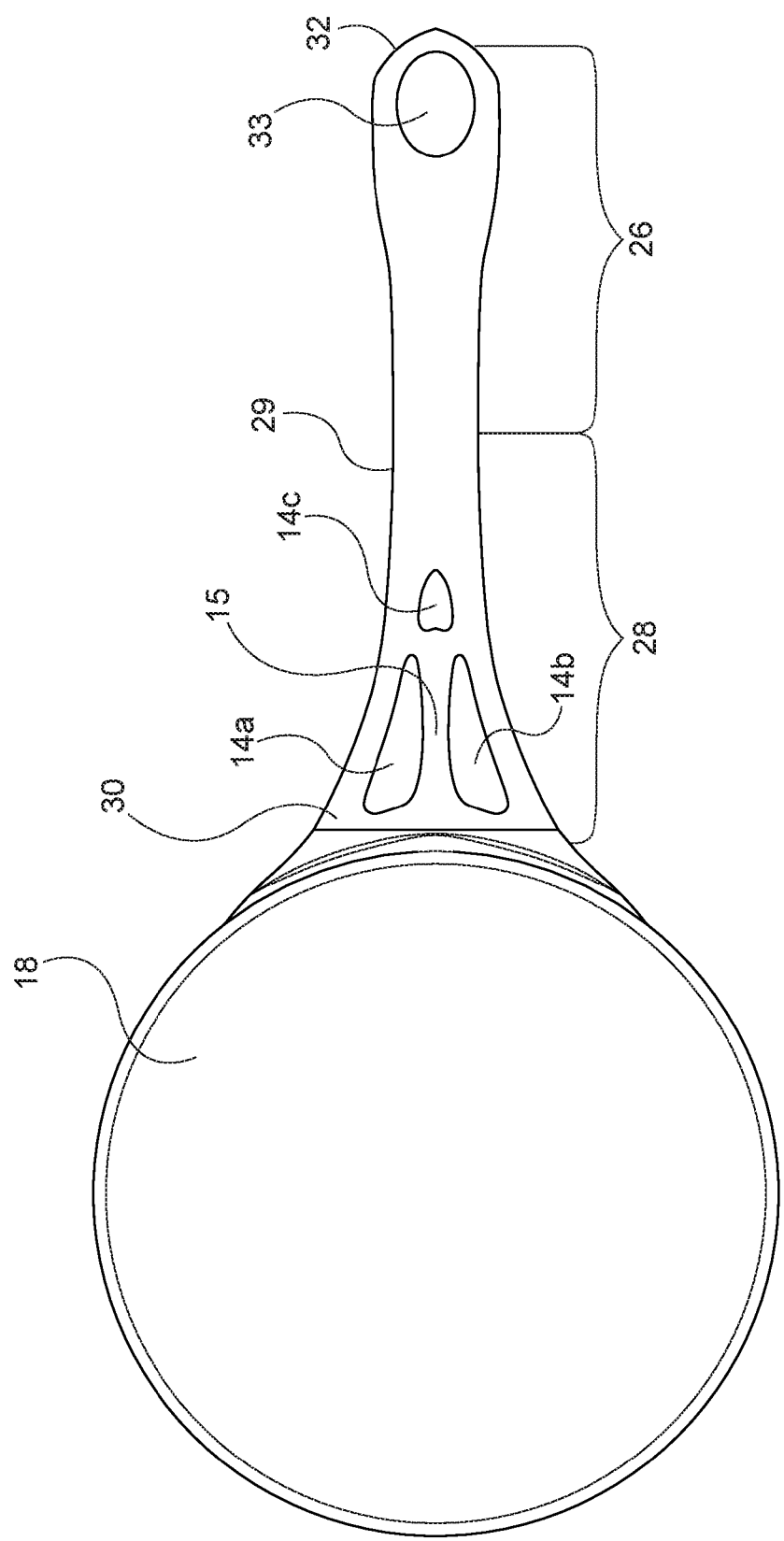
FIG. 4 is a plan view of the top of a cooking vessel fabricated by the method of the present invention.

As seen in FIGS. 2, 3 and 4, the handles used in the present invention have deeper concave pressed sections in the neck portion 28 where strength is most required (particularly with large venting holes), transitioning through to shallow concave sections in the hand grip portion toward the end 32 of the handle for hand comfort. The whole of the handle could be pressed in a convex section (opposite to the current invention shown and described above) though comfort would be sacrificed. Only the end of the handle could be pressed in the convex direction, though some rotational stability would be lost.

The handle shape in the present invention achieves sufficient strength, while at the same time improving dynamic hand strain.

The broad concave end 32 of the handle resists the rotational forces present whenever cooks are handling the pan with the classic sauté toss (often for restaurant chefs). The fingers rest on the comfortable convex surface under the handle, while the ball of the hand is cupped by the concave end 32 on top. The handle design also works with an alternative grip used by cooks, with fingers on top and ball underneath handle. With that handle design, the fingertips rest in the concave hollow of the handle on top, while the ball of the hand controls the broad slightly convex end portion of the handle from underneath.

Therefore, to achieve the above handle goals, the present invention utilizes a deep concave U-shape through the neck portion of the handle that must carry the most load to provide a greatly increased strength to counter the handle bending force. This deep section transitions to a shallow and less concave U-shape in the hand grip portion 26 to provide more comfort, avoiding uncomfortable edges or ridges from more vertical section edges.

The end 32 of the handle where the ball of the hand typically rests is designed to take half of the load (the digits taking the other half in the opposing vertical direction), the handle in this incarnation of the invention utilizes a significantly broader shallow concave end 32 to assist the hand's ability to counter rotational forces (with reduced squeezing force required from the hand).

Reduced heat transfer to hand is achieved by creating openings 14a, 14b and 14c in the handle. While these openings may appear decorative, the system of offset openings in the neck portion of the handle is arranged to maximize heat dissipation within constraints of required handle strength. This follows the principle of increasing the surface area relative to total cross-sectional area (or volume), to encourage dissipation of internally-conducted heat through thermal radiation and convection. It was found that as this ratio is increased, the portion 26 of the handle gripped by the hand could receive a low enough level of conducted heat to allow the pan to be lifted with a bare hand from the stove top, for most normal cooking operations. This venting was a vast improvement over traditional solid steel or iron handles of nominally round cross-section, or flat rectangular metal handles with no venting features.

The same principles described above can be employed for fabricating cookware lids, whereby the lid has a long extended handle similar to the cookware, thus solving the common lid issues of hot and fragile handles. The lid handle may be formed to a similar shape as the cookware handle, so as to nest neatly on top of the cookware handle. Such a lid with long handle may be configured to also double as a low-walled griddle or crêpe pan.

Presently, there exists no cookware which combines the manufacturing processes and handle design features of the present invention to achieve commercially viable cookware, with all the significant performance advantages detailed above, for professional chefs or home cooks.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

I claim:

1. A method for fabricating single-piece cookware vessel with a handle from a sheet of metal comprising the steps of:
    (a) forming the profile shape of the vessel, including the handle portion, from a single sheet of metal to create a flat profiled blank of uniform thickness;
    (b) spinning the flat profiled blank to form the shape of a vessel body with an integral handle portion; and
    (c) forming the handle by creating three-dimensional contours in the handle portion.

2. The method of claim 1 wherein the step of forming the profile shape of the vessel comprises the step of cutting the single sheet of metal to create the desired profile.

3. The method of claim 1 wherein the step of forming the profile shape of the vessel comprises the step of stamping the single sheet of metal to create the desired profile.

4. The method of claim 1 wherein the step of forming the profile shape of the vessel comprises the step of blanking the single sheet of metal to create the desired profile.

5. The method of claim 1 wherein the step of forming the profile shape of the vessel further comprises the step of reducing the amount of metal in the handle portion.

6. The method of claim 5 wherein the step of reducing the amount of metal in the handle portion comprises the step of creating an opening in the handle portion.

7. The method of claim 5 wherein the step of reducing the amount of metal in the handle portion comprises the step of creating more than one opening in the handle portion.

8. The method of claim 5 wherein the step of reducing the amount of metal in the handle portion comprises the step of creating at least one opening in the handle portion which removes at least 30% of the handle width.

9. The method of claim 1 wherein the step of spinning the flat profiled blank is performed on a spinning machine.

10. The method of claim 1 wherein the thickness of the flat profiled blank is in the range of 1 mm to 8 mm.

11. The method of claim 1 wherein the thickness of the flat profiled blank is in the range of 2 mm to 5 mm.

12. The method of claim 1 wherein the metal sheet comprises low carbon mild steel.

13. The method of claim 1 wherein the metal sheet comprises carbon steel.

14. The method of claim 1 wherein the metal sheet comprises stainless steel.

15. The method of claim 1 wherein the metal sheet comprises copper, titanium or any other metal suitable for cookware.

16. The method of claim 1 wherein the step of forming the handle comprises imparting additional strength in the vertical plane by forming curved cross-sections.

17. The method of claim 16 wherein the step of imparting additional strength using a stamping-forming die set.

18. The method of claim 16 wherein the step of imparting additional strength includes the steps of inserting the flat handle profile between the upper and lower die of a die set and pressing with sufficient force to permanently deform the flat handle profile into the desired three-dimensional form, while sheet thickness remains substantially uniform.

19. The method of claim 16 wherein the step of forming the handle comprises forming the handle to have a hand grip portion with a "U" shape cross-section.

20. The method of claim 17 wherein the step of forming the handle comprises forming the handle to have a neck portion with a "U" shape cross-section.

21. The method of claim 20 wherein the step of forming the handle comprises forming the handle to have a neck portion with a greater curvature than the hand grip portion.

22. The method of claim 19 wherein the step of forming the handle comprises forming the handle to have a neck portion with a flattened "U" shape cross-section.

23. The method of claim 1 wherein the step of forming the handle comprises forming the neck portion to have a deeply curved cross-section and the hand grip portion to have a reduced curvature.

24. The method of claim 1 wherein the step of forming the handle comprises forming the curve in the neck portion to be deeper for thinner and lower tensile strength metals.

25. The method of claim 1 wherein the step of forming the handle comprises forming a the section of neck portion proximate the pan body to have a width of 60 mm and a curvature with a cross-section of R200 mm or less.

26. The method of claim 25 wherein the step of forming the handle comprises forming the section of the neck portion immediately adjacent the pan body to be substantially flat.

27. The method of claim 26 wherein the step of forming the handle comprises forming the section of the neck portion adjacent the flat section to have a curvature of R100 mm or less.

28. The method of claim 27 wherein the step of forming the handle comprises forming a the section of the neck portion that transitions from the neck portion to the hand grip portion, to be located in the range of 100 mm to 270 mm from the pan body.

29. The method of claim 28 wherein the step of forming the handle comprises forming the transition section to be less wide and less deep in cross-section than the hand grip portion.

30. The method of claim 28 wherein the step of forming the handle comprises forming the transition section to have a curvature within the range of R1000 mm to R10 mm.

31. The method of claim 30 wherein the step of forming the handle comprises forming the transition section to have a curvature within the range of R500 mm to R30 mm.

* * * * *